United States Patent
Keerl

(10) Patent No.: US 9,261,011 B2
(45) Date of Patent: Feb. 16, 2016

(54) COOLING MODULE AND PAIR OF ADAPTERS FOR MODULE STANDARDIZATION

(75) Inventor: Bjoern Keerl, Sachsenheim (DE)

(73) Assignee: MAHLE International GmbH, Stuttgart (DE)

(*) Notice: Subject to any disclaimer, the term of this patent is extended or adjusted under 35 U.S.C. 154(b) by 444 days.

(21) Appl. No.: 12/959,068

(22) Filed: Dec. 2, 2010

(65) Prior Publication Data

US 2011/0127005 A1   Jun. 2, 2011

(30) Foreign Application Priority Data

Dec. 2, 2009   (DE) .................. 10 2009 056 508

(51) Int. Cl.
| | |
|---|---|
| B60K 11/04 | (2006.01) |
| F01P 3/18 | (2006.01) |
| F28F 9/00 | (2006.01) |
| F28F 21/06 | (2006.01) |
| F28D 1/04 | (2006.01) |

(52) U.S. Cl.
CPC . *F01P 3/18* (2013.01); *B60K 11/04* (2013.01); *F28F 9/002* (2013.01); *F28F 21/06* (2013.01); *F01P 2003/187* (2013.01); *F01P 2050/24* (2013.01); *F28D 1/0435* (2013.01); *F28F 2255/143* (2013.01); *Y10T 29/49716* (2015.01)

(58) Field of Classification Search
CPC .... B60K 11/04; B62D 25/084; B62D 25/085; F28D 1/0435; F28F 9/001; F28F 2009/004
USPC .............. 180/68.4, 68.6, 65.1; 165/41, 42, 43
See application file for complete search history.

(56) References Cited

U.S. PATENT DOCUMENTS

| | | | | |
|---|---|---|---|---|
| 4,763,723 | A * | 8/1988 | Granetzke | 165/67 |
| 5,183,103 | A * | 2/1993 | Tokutake | 165/67 |
| 5,219,016 | A * | 6/1993 | Bolton et al. | 165/41 |
| 5,257,662 | A * | 11/1993 | Osborn | 165/173 |
| 5,597,047 | A | 1/1997 | Thompson et al. | |
| 6,059,019 | A * | 5/2000 | Brost et al. | 165/67 |
| 6,318,454 | B1 * | 11/2001 | Schule et al. | 165/140 |
| 6,382,312 | B2 * | 5/2002 | Avequin et al. | 165/140 |
| 6,470,961 | B1 | 10/2002 | Case | |

(Continued)

FOREIGN PATENT DOCUMENTS

| | | |
|---|---|---|
| DE | 91 14 734 U1 | 1/1992 |
| DE | 43 33 613 A1 | 4/1994 |

(Continued)

OTHER PUBLICATIONS

CDX etext: how to replace a radiator (http://www.cdxetextbook.com/engines/cool/coolingSystem/replaceradiator.html); Jan. 5, 2009.*

*Primary Examiner* — Katy M Ebner
*Assistant Examiner* — Emma K Frick
(74) *Attorney, Agent, or Firm* — Muncy, Geissler, Olds & Lowe, P.C.

(57) ABSTRACT

In order to standardize the structure of a cooling module with and without a main radiator and thus to make a cooling module equally usable for motor vehicles with an internal combustion engine as well as with an electric motor and for hybrid vehicles it is provided to replace the bearing and holding function of a cooling component, in particular of the radiator unit flowed through by air and engine fluid of an internal combustion engine, by two adapter parts.

14 Claims, 9 Drawing Sheets

(56) References Cited

U.S. PATENT DOCUMENTS

| | | | |
|---|---|---|---|
| 7,150,335 B2 * | 12/2006 | Sasano et al. | 180/68.4 |
| 7,234,511 B1 * | 6/2007 | Lesage | 165/69 |
| 7,500,514 B2 * | 3/2009 | Heine | 165/140 |
| 7,552,757 B2 * | 6/2009 | Hassdenteufel et al. | 165/67 |
| 7,971,670 B2 * | 7/2011 | Shiomi et al. | 180/65.31 |
| 8,220,576 B2 * | 7/2012 | Terada et al. | 180/68.4 |
| 8,267,209 B2 * | 9/2012 | Kuwabara et al. | 180/68.4 |
| 8,312,951 B2 * | 11/2012 | Bui et al. | 180/68.4 |
| 2007/0144713 A1 | 6/2007 | Sugimoto et al. | |
| 2008/0099641 A1 | 5/2008 | Best et al. | |
| 2008/0230291 A1 | 9/2008 | Kersting | |
| 2011/0209935 A1 * | 9/2011 | Nantais et al. | 180/68.4 |

FOREIGN PATENT DOCUMENTS

| | | |
|---|---|---|
| DE | 195 42 125 A1 | 5/1996 |
| DE | 42 44 039 C2 | 7/1996 |
| DE | 198 57 494 A1 | 7/1999 |
| DE | 10 2005 044 557 A1 | 4/2007 |
| DE | 10 2005 051661 A1 | 5/2007 |
| DE | 10 2006 060085 A1 | 6/2007 |
| DE | 10 2007 006 241 A1 | 8/2008 |
| DE | 10 2007 232 A1 | 8/2008 |
| DE | 10 2007 051 128 A1 | 4/2009 |
| GB | 2 332 507 A | 6/1999 |

* cited by examiner

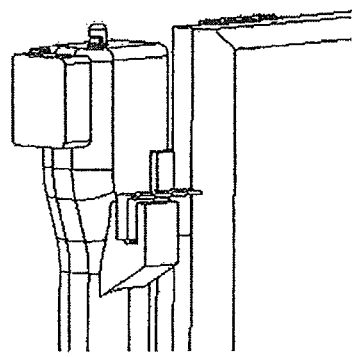
Fig. 10
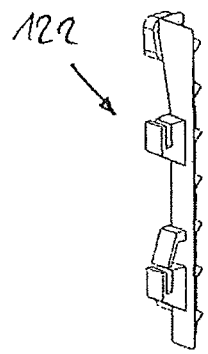
Fig. 11
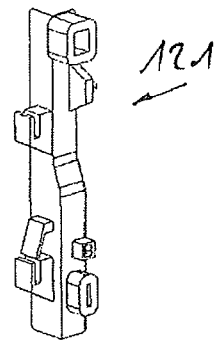
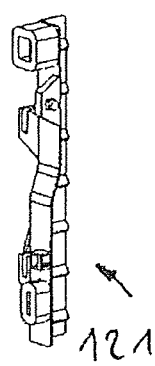
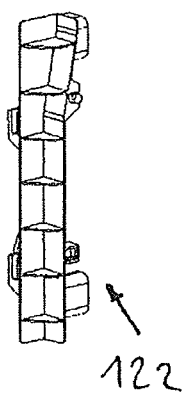

COOLING MODULE AND PAIR OF ADAPTERS FOR MODULE STANDARDIZATION

This nonprovisional application claims priority under 35 U.S.C. §119(a) to German Patent Application No. DE 10 2009 056 508.6, which was filed in Germany on Dec. 2, 2009, and which is herein incorporated by reference.

BACKGROUND OF THE INVENTION

1. Field of the Invention

The invention relates to a cooling module for motor vehicles as well as a pair of adapters with a first adapter element and a second adapter element for holding cooling and frame components of a cooling module for motor vehicles, furthermore the invention also relates to a mounting method.

2. Description of the Background Art

Cooling modules in which several cooling functions are carried out by a plurality of cooling components, are known from DE 42 44 039 C2. It is disclosed there to arrange a cooling component in the form of an intake air cooler in a parallel manner in front of a cooling surface, flowed through by air, of a radiator unit. It is proposed in DE 42 44 039 C2 to reduce the construction depth of cooling modules of this type, in particular when an oil cooler is also provided.

A shroud for a cooling module of a motor vehicle is known from DE 10 2005 044 557 A1, which shroud is embodied as a carrier for cooling components in the form of a heat exchanger and a cooling fan. The shroud has support elements projecting laterally, with which a mounting of connections for the heat exchanger is considerably simplified.

Several drive concepts are known for motor vehicles. Drives by internal combustion engines are very widespread. Furthermore, battery operated electric vehicles as well as hybrid systems are known. In the case of hybrid systems, an can also be used in addition to the electric motor, which internal combustion engine is not directly used for the drive but for power generation, such as, in order to achieve larger distances. The cited drive concepts require cooling modules with different cooling components. A simple cooling module for a motor vehicle with a drive by an internal combustion engine requires a main radiator, i.e., a radiator unit flowed through by air and engine coolant as well as a fan module. Depending on the equipment of the motor vehicle, the cooling module can be expanded by further components, such as a condenser component, an intake air cooler, a low-temperature cooler and an oil cooler. In the case of a vehicle with electric drive, in contrast, a radiator unit flowed through by air and engine coolant can be omitted. Instead, a complex cooling for a battery block is necessary.

A cooling module that is flexibly adjustable for all drive concepts has not been hitherto known. Instead, the different components have to be individually assembled for each drive concept. Due to the individual assembly, so far it has been possible to carry out the module attachment and the stiffness of the module only by correspondingly adapted components. The individual adaptation of the module attachment for cooling modules for motor vehicles with different drive concepts leads to high development and storage costs, since a corresponding diversity of parts is necessary.

SUMMARY OF THE INVENTION

It is therefore an object of the invention to provide a cooling module and a pair of adapters for a cooling module, with which development costs can be saved and which reduces the diversity of the radiator components for the radiator module and thereby retains the function of the individual radiator components with regard to carrying, holding and connecting function. In particular, it is an object to propose a method with which for motor vehicles that are to be converted from internal combustion engine drive to a drive without an internal combustion engine, their cooling module can also be converted easily.

The proposed cooling module for motor vehicles has a plurality of cooling and frame components. The cooling module can be connected to the body of the motor vehicle by means of a pair of adapters, wherein an uncoupling can be carried out by means of connecting elements, for example, of an elastomer or in the form of rubber grommets that are arranged between the automotive body and the adapter at the connection points. At least one cooling or frame component is attached in front of or behind the pair of adapters free from play. A free space is created between two adapter elements, which can be arranged laterally on the cooling module, of the pair of adapters, for example, when a radiator unit flowed through by air and engine fluid is omitted.

The cooling module is to be attached to a body of the motor vehicle by means of the proposed pair of adapters with a first adapter element and a second adapter element for holding cooling and frame components of a cooling module for motor vehicles. Between the two adapter elements a free space can be left or alternatively a cooling component, in particular a radiator unit flowed through by air and engine fluid of an internal combustion engine, that can be held by means of the pair of adapters and can be fixed thereto. The pair of adapters has holder elements by means of which a further cooling component and/or a frame component can be held directly in front of and/or behind the pair of adapters.

The object is further attained through a method for converting cooling modules by disassembly of a radiator unit flowed through by air and engine fluid from the cooling module and the assembly of a pair of adapters in the construction space left by the disassembly.

If motor vehicles are driven by an electric drive, the proposed pair of adapters takes over the bearing function and the attachment tasks of the radiator unit, omitted in this case, flowed through by air and engine fluid of an internal combustion engine. Through the invention, the variant diversity of cooling module components is reduced and corresponding development costs are saved. A further advantage of the invention can be achieved in that the cooling module components are used in the modular design principle, that is, they can be share components with regard to their attachment components.

In order to achieve the required stiffness of the cooling module, the attachment can be provided by laterally projecting shrouds on the at least one cooling or frame component in front of or behind the pair of adapters and shroud receptacles on each adapter element, which grip the shrouds from below. The attachment can also be provided by other means, such as by cross connection elements on the adapter elements crosswise to the vehicle longitudinal direction or via another connection embodied free from play of the adapter elements with a frame component, such as a condenser frame for holding the condenser component.

In an embodiment there is an absence of play between the shrouds and the shroud receptacles in an assembled condition, in particular in a transverse direction to the air flow direction (Y direction). This simplifies the mounting of the cooling module, since the shroud-bearing component of the cooling module can be tipped in particular in the direction of the play.

In a further embodiment, it is proposed to provide the attachment in an operating condition by fixing agents, in particular by a threaded assembly through the shrouds and shroud receptacles, whereby the above referenced absence of play is cancelled.

The cooling or frame components that can be attached to the pair of adapters can be, for example, selected from: fan shroud, fan module frame, condenser module, condenser frame, intake air cooler module, intake air cooler frame, low-temperature cooler module, low temperature cooler module frame, oil cooler module, oil cooler module frame, etc.

If the motor vehicle has an internal combustion engine, a radiator unit flowed through by air and engine fluid of the internal combustion engine can be held firmly between the two adapter elements, which can be arranged laterally on the cooling module, of the pair of adapters. In this case the pair of adapters is part of the radiator unit and can be flowed through by fluid accordingly. If the motor vehicle has an electric drive, a free space can be left between the two adapter elements, which can be arranged laterally on the cooling module, of the pair of adapters. The adjustment of the cooling module to the cited concepts can thus essentially be carried out merely by an installation or omission of the radiator unit. The pair of adapters takes over at least all of the bearing, attaching and/or carrying functions of the respectively omitted module.

In a further embodiment it is proposed that each adapter element has fixing agents for attaching to the vehicle body, in particular threaded connections or pin connections on the top and/or bottom. In particular the attachment to the vehicle body can be carried out solely via these fixing agents. Alternatively, it is proposed to supplement the fixing at other locations of the cooling module components.

In an embodiment, each adapter element can be produced as a plastic injection part. Preferably, an adapter element can be reinforced by preferably interior ribs, braces or a truss-like lattice or honeycomb structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 10 is a detailed view of FIG. 9 with attachment component shown in more detail;

FIG. 11 is a further pair of adapters in four perspective views with interior ribs.

DETAILED DESCRIPTION

Figure 1:
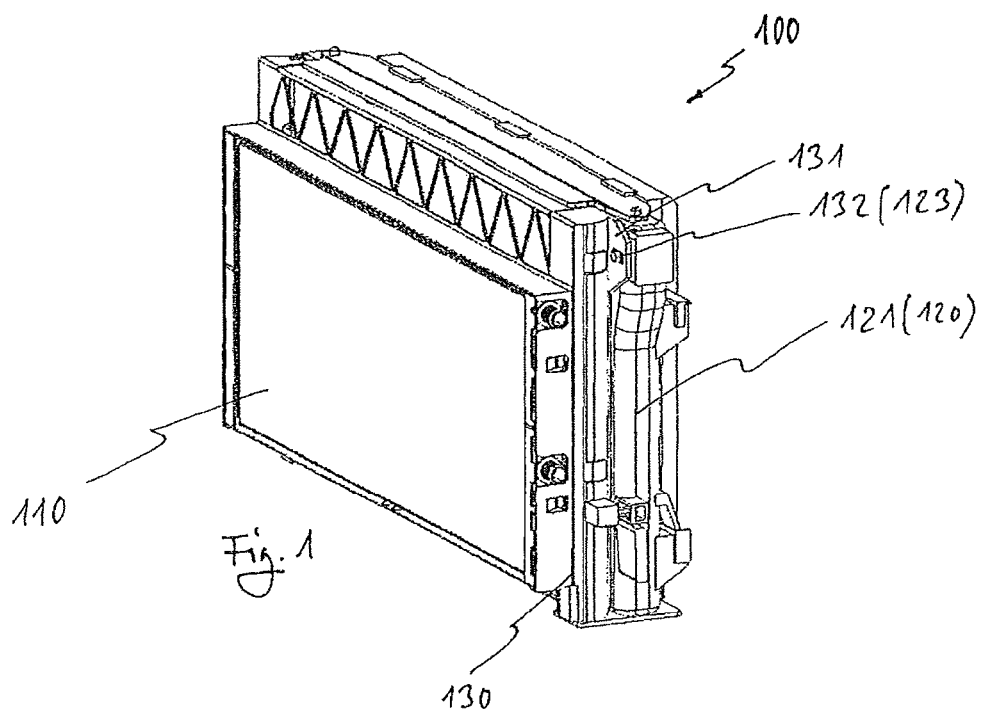
FIG. 1 is a perspective view of a cooling module according to an embodiment.
Figure 2:
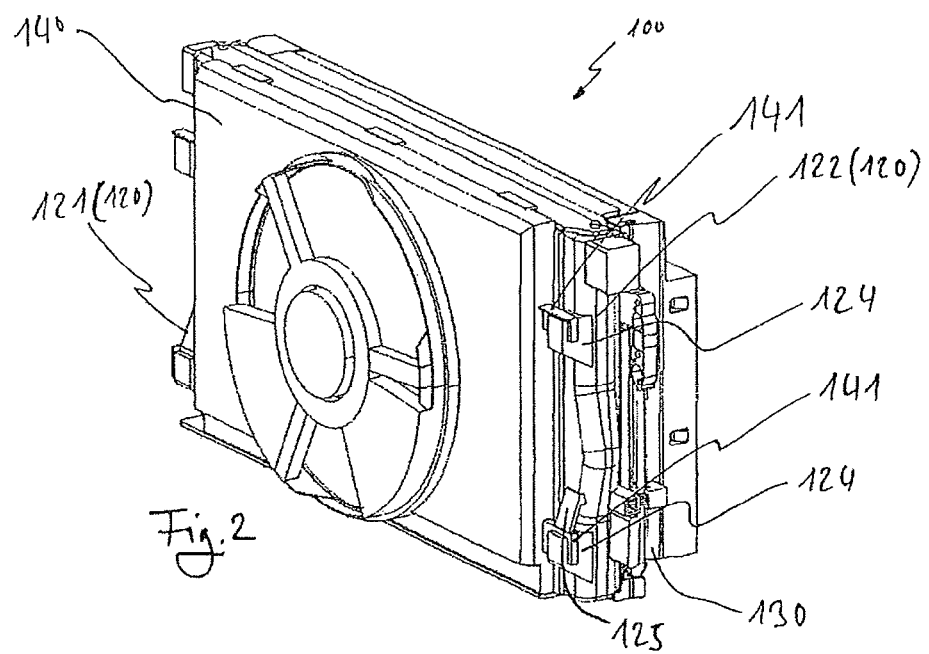
FIG. 2 illustrates the cooling module in FIG. 1 in a further perspective view.

A cooling module 100 shown in perspective from the front in FIG. 1 and from the back in FIG. 2 for a motor vehicle (not shown here) is composed of a plurality of cooling and frame components and shows in particular adapter elements 121, 122 of a pair of adapters 120. The terms, front, back, top, bottom, laterally, centrally, left and right refer to the viewing direction of a motor vehicle (not shown here) in which the cooling module is installed. In FIG. 1 a low-temperature cooler 110 is shown, which is attached in front of a condenser frame 130. In addition to the low-temperature cooler, the condenser frame 130 also bears a condenser module shown in FIG. 3. The condenser frame 130 is provided on the left and right with respectively one laterally projecting flange 131, which respectively has an opening 132. The condenser frame 130 is held by a clip connection, not shown in further detail here, in the lower region with the pair of adapters or the radiator unit. In the upper region for connection a bolt 123 with bolt groove with the adapters 121, 122 and connected and secured via a securing clip (not shown here).

FIG. 2 shows in particular a fan shroud 140 for bearing a fan with electric motor (not shown here). The fan shroud has respectively two laterally projecting rectangular shrouds 141 on the left and on the right. These shrouds 141 are sunk from above into corresponding shroud receptacles 124, open at the top, of the adapter elements 121, 122. To improve the stability of the shroud connection, the shroud receptacles 124 are reinforced at the bottom in that the part located under the shroud 141 is thickened towards the adapter element 121, 122. Furthermore, the lower shroud receptacles also have respectively one click-stop element in the form of a snap-on bracket 125, which prevents the lower shrouds from springing out of the shroud receptacle. Each snap-on bracket 125 is arranged such that a lower edge lies above the top of the shroud in the clicked-in or snapped-in condition. The snap-on brackets can be elastically deformed in that, during the assembly of a radiator component on the adapter elements 121, 122, they can be moved towards these adapter elements and spring back when the assembly is completed.

Figure 3:
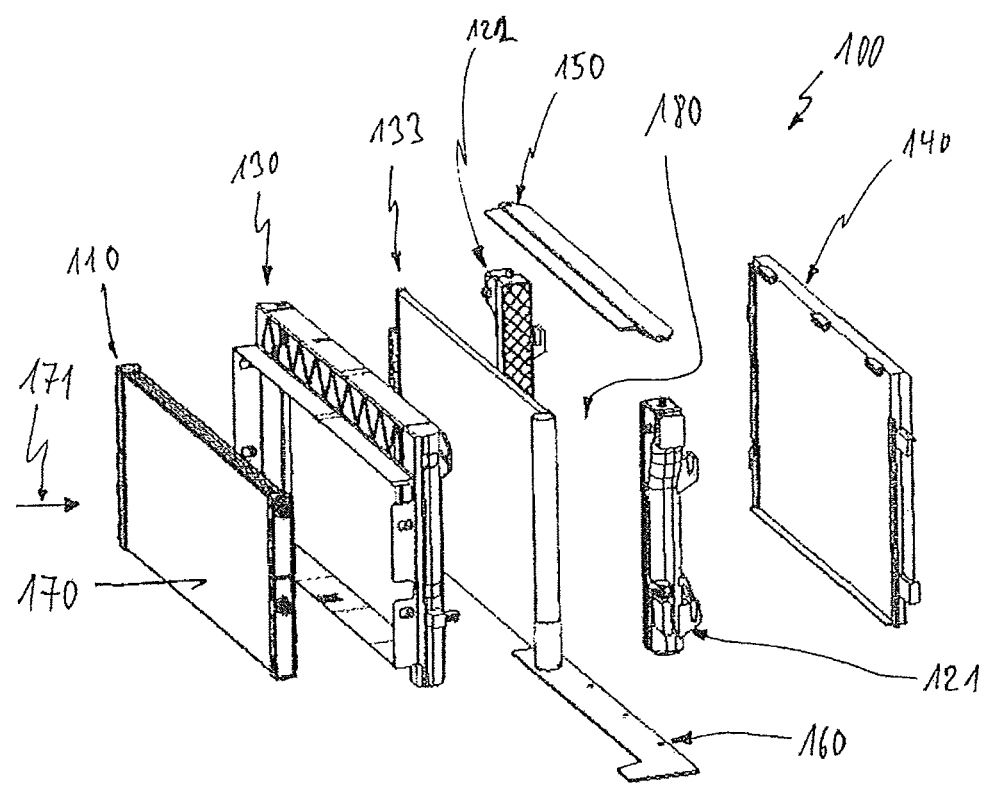
FIG. 3 is an exploded view of the cooling module from the perspective shown in FIG. 1 with a free space between adapter elements.
Figure 4:
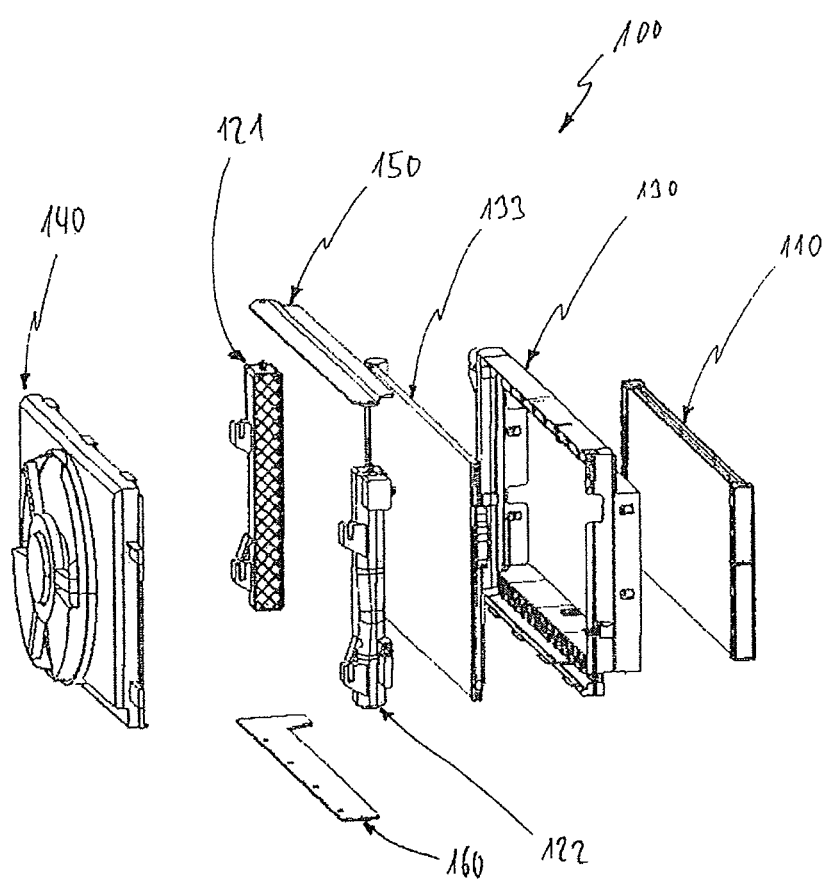
FIG. 4 is an exploded view of the cooling module from the perspective shown in FIG. 2 with a free space between adapter elements.
Figure 5:
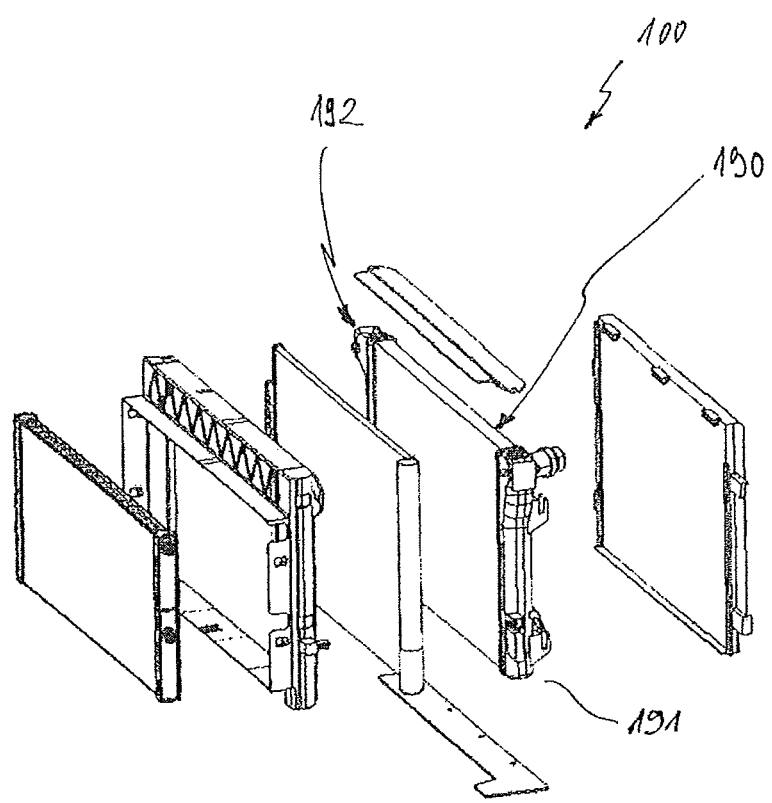
FIG. 5 is an exploded view of the cooling module from the perspective shown in FIG. 1 with a radiator unit with two alternative adapter elements that can be flowed through by fluid.
Figure 6:
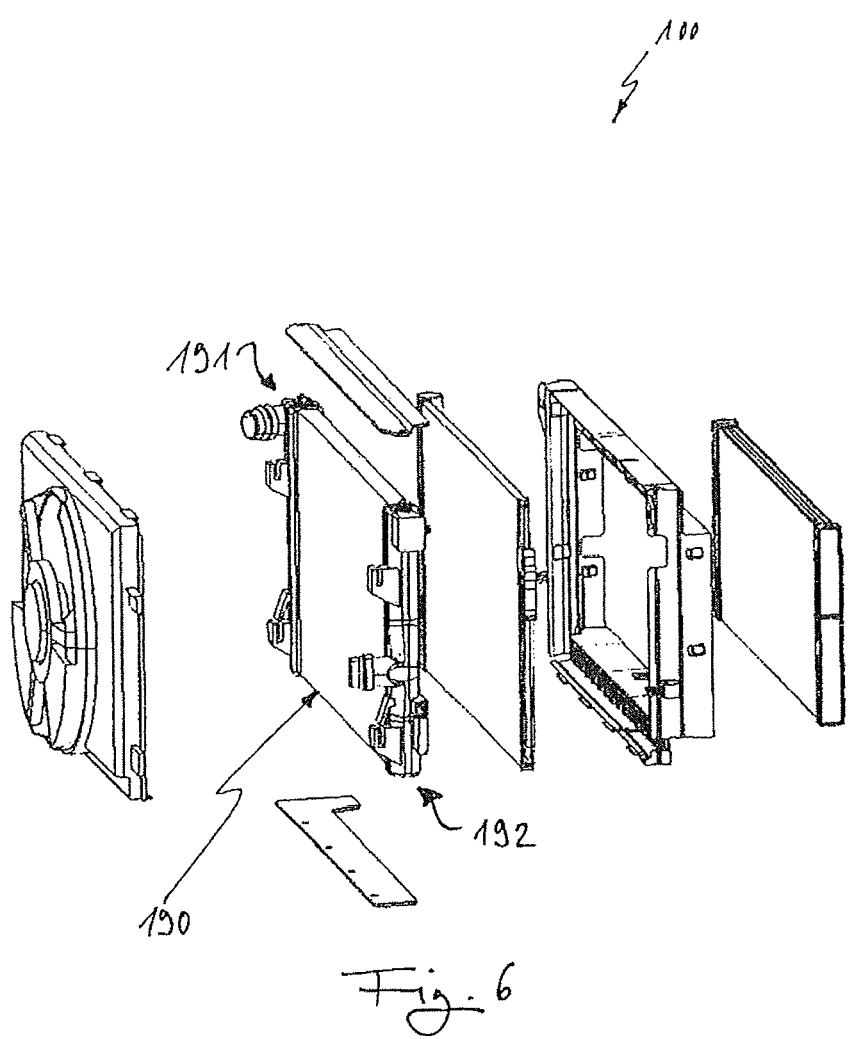
FIG. 6 is an exploded view of the cooling module from the perspective shown in FIG. 2 with a radiator unit according to FIG. 5.

FIGS. 3 and 4 show the cooling module 100 in a perspective view from the front (FIG. 3) and from the back (FIG. 4). The low-temperature cooler 110, the condenser frame 130, a condenser module 133, an upper air baffle 150 that can be optionally mounted for air guidance, a lower attachment sheet 160, the two adapter elements 121, 122 and the fan shroud 140, which is shown without an opening for greater clarity, are shown. Air flows into the air intake plane 170 in the direction of the arrow 171. A free space 180 between the two adapter elements 121, 122 should be pointed out, which free space remains if, as in the case shown, a radiator unit for internal combustion engines is not used. The pair of adapters shown in FIGS. 3 and 4 cannot be flowed through by fluid due to the interior lattice structure that is used for reinforcement, and is thus not suitable for holding or for connection of a radiator unit, but can instead take over all of the holding, bearing and connecting functions of an assembly of this type without replacing the cooling function.

In contrast to FIGS. 3 and 4, FIGS. 5 and 6 show a further cooling component in the form of a radiator unit 190 that is flowed through by air and engine fluid of an internal combustion engine, such as is necessary for cooling internal combustion engines. The radiator unit 190 in this case has two adapter elements in the form of fluid-conveyable boxes 191, 192 of plastic that are connected with a so-called network (a soldered aluminum component composed of tubes, ribs, bases and side parts), not shown in detail here, of the radiator unit 190. Optionally, these adapter elements 191, 192 can be used either to hold a radiator unit flowed through by air and engine fluid of an internal combustion engine or to create a free space and to take over or replace all of the holding, bearing and connecting functions of the radiator unit.

Figure 7:
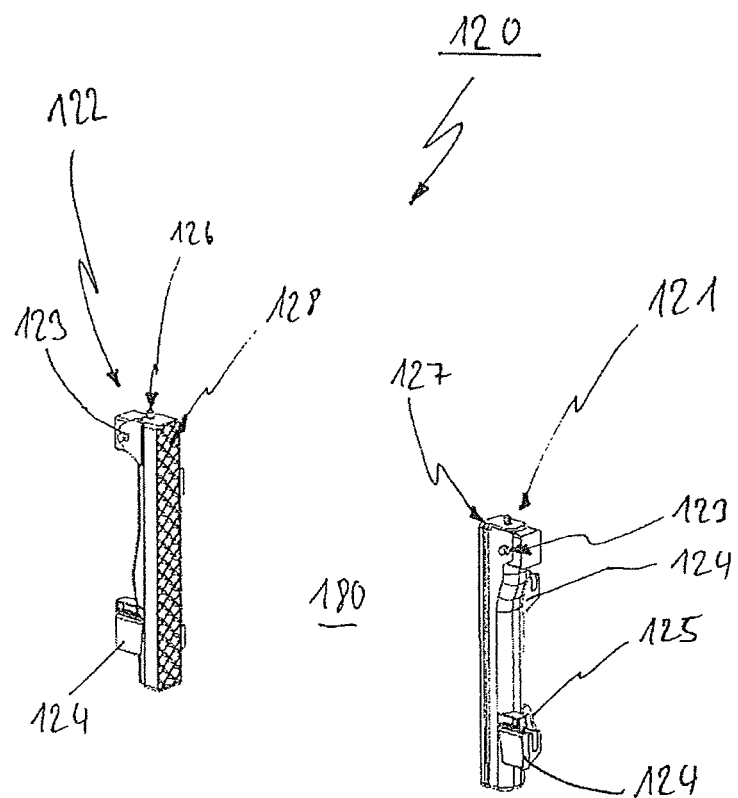
FIG. 7 illustrates the pair of adapters as shown in FIGS. 3 and 4.

FIG. 7 shows again the adapter elements 121, 122, which are unsuitable for connection to a radiator unit. Plug-in pins 126 can be seen clearly here, arranged on the top of the adapter elements, which plug-in pins render possible a plug-in connection with further cooling components, such as with the upper air baffle. Furthermore, the interior reinforcement of an adapter element by a lattice structure 128 is shown.

Figure 8:
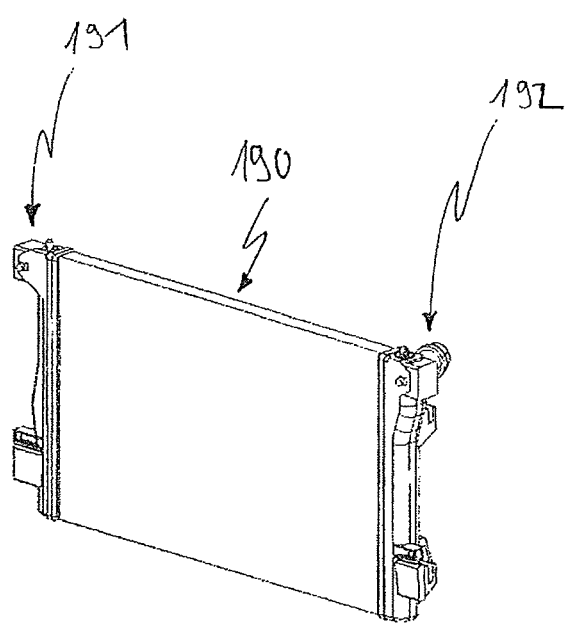
FIG. 8 illustrates the pair of adapters that can be flowed through by fluid with radiator unit as shown in FIGS. 5 and 6.

FIG. 8 shows again a radiator unit 190 with the adapter elements 191, 192. The adapter elements are respectively surrounded by a full perimeter collar 127 of aluminum projecting inwards.

Figure 9:
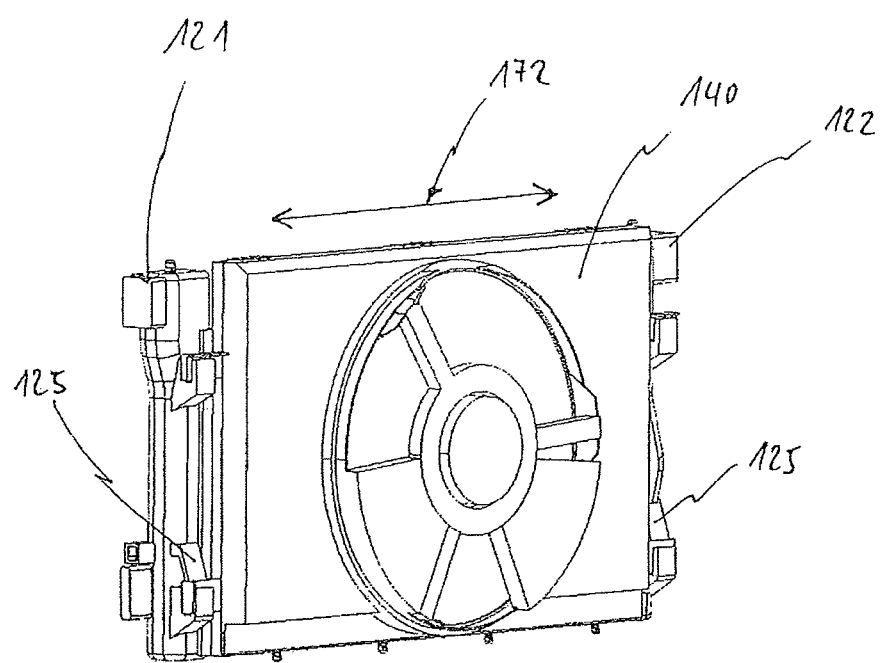
FIG. 9 is a fan component attached to the pair of adapters.

FIG. 9 shows the fan shroud preassembled with the two adapter elements 121, 122, In this condition it is still possible for the fan shroud to be moveable to the left and to the right, that is, in the Y direction 172. This is definitely desirable for an assembly, but is to be avoided in an operating condition. A corresponding subsequent fixing by fixing elements is necessary for this purpose.

FIG. 10 shows diagrammatically a possible fixing by a screw, not shown, which is screwed into a bore indicated by a cross 129. The screw head can thereby press the shroud receptacle onto the shroud and fix it there free from play.

FIG. 11 shows a further pair of adapters 120 in the two upper views from the front and in the two lower view from the back. Of course, this pair of adapters is not suitable for use with a radiator unit either, but provides a material-saving way of omitting the radiator unit and of taking over the carrying, holding and connecting functions thereof inside a cooling module. The two side walls of the pair of adapters are connected to one another in an L-shaped manner and reinforced by interior ribs.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cooling module for a motor vehicle, the cooling module comprising:
   a plurality of cooling components;
   a plurality of frame components; and
   a pair of fluid-conveyable adapters and a pair of non-fluid-conveyable adapters being alternatively interchangeable and arranged such that either the pair of fluid-conveyable adapters or the pair of non-fluid-conveyable adapters is arranged laterally on the cooling module, at least one cooling or frame component being attached in front of or behind the pair of fluid-conveyable or non-fluid-conveyable adapters free from play,
   wherein the pairs of adapters are separable from all other components of the cooling module, and
   wherein the at least one cooling or frame component, the pair of fluid-conveyable adapters and the pair of non-fluid conveyable adapters have the same attachment structures.

2. A motor vehicle comprising a cooling module according to claim 1, wherein a radiator unit that is configured to be flowed through by air and engine fluid of an internal combustion engine is held firmly between the two adapter elements, which are arranged laterally on the cooling module, of the pair of fluid-conveyable adapters.

3. An electric motor vehicle comprising a cooling module according to claim 1, wherein a free space is formed between the two adapter elements, which are arranged laterally on the cooling module, of the pair of non-fluid-conveyable adapters.

4. The cooling module according to claim 1, wherein a space is formed between the pair of non-fluid conveyable adapters, and wherein an entirety of the space is free.

5. A cooling module comprising:
   a first adapter element and a second adapter element holding cooling or frame components of a cooling module for a motor vehicle,
   wherein the first adapter element and the second adapter element are disposed between at least one first cooling or frame component attached in front of the first and second adapter elements and at least one second cooling or frame component attached behind the first and second adapter elements, and
   wherein the first adapter element and the second adapter element hold the first and second cooling or frame components directly in front of and behind the first adapter element and the second adapter element,
   wherein an entirety of a space between the first adapter element and the second adapter element is free, the space being delimited by interlateral sides of the first adapter element and the second adapter element and by the at least one first cooling or frame component attached in front of the first and second adapter elements and the at least one second cooling or frame component attached behind the first and second adapter elements, and
   wherein the first adapter element and the second adapter element comprise a reinforcing interior lattice structure configured to prevent fluid from flowing through the first adapter element and the second adapter element.

6. The cooling module according to claim 5, wherein each adapter element has fixing agents for attaching to a vehicle body.

7. The cooling module according to claim 6, wherein the fixing agents comprise pin connections.

8. The cooling module according to claim 5, wherein each adapter element is produced as a plastic injection part.

9. A method for converting cooling modules, the method comprising:
   disassembling a radiator unit that is configured to be flowed through by air and engine fluid from a cooling module; and
   assembling a cooling module according to claim 5 in a construction space left by the disassembly.

10. A cooling module comprising:
    a first adapter element and a second adapter element holding cooling or frame components of a cooling module for a motor vehicle,
    wherein the first adapter element and the second adapter element are disposed between at least one first cooling frame component attached in front of the first and second adapter elements and at least one second cooling or frame component attached behind the first and second adapter elements, and wherein the first adapter element and the second adapter element hold the first and second cooling or frame components directly in front of and behind the first adapter element and the second adapter element, wherein an entirety of a space between the first adapter element and the second adapter element is free, the space being delimited by interlateral sides of the first adapter element and the second adapter element and by the at least one first cooling or frame component attached in front of the first and second adapter elements and the at least one second cooling or frame component attached behind the first and second adapter elements, and wherein the first adapter element and the second adapter element comprise:

a reinforcing interior lattice structure configured to prevent fluid from flowing through the first adapter element and the second adapter element; and shroud receptacles formed at each end of the first adapter element and the second adapter element, each shroud receptacle comprising:
a reinforcing portion having a thickness greater than that of a remainder of the shroud receptacles; and
an elastically deformable bracket configured to hold a shroud within the shroud receptacles.

11. The cooling module according to claim 10, wherein each adapter element has fixing agents for attaching to a vehicle body.

12. The cooling module according to claim 11, wherein the fixing agents comprise pin connections.

13. The cooling module according to claim 10, wherein each adapter element is produced as a plastic injection part.

14. A method for converting cooling modules, the method comprising:
disassembling a radiator unit that is configured to be flowed through by air and engine fluid from a cooling module; and
assembling a cooling module according to claim 10 in a construction space left by the disassembly.

* * * * *